United States Patent
Dudley, Jr.

(10) Patent No.: US 8,931,334 B1
(45) Date of Patent: Jan. 13, 2015

(54) RE-USABLE TIRE MONITOR ASSEMBLY

(71) Applicant: Jimmie E. Dudley, Jr., Kilgore, TX (US)

(72) Inventor: Jimmie E. Dudley, Jr., Kilgore, TX (US)

( * ) Notice: Subject to any disclaimer, the term of this patent is extended or adjusted under 35 U.S.C. 154(b) by 0 days.

(21) Appl. No.: 14/060,836

(22) Filed: Oct. 23, 2013

(51) Int. Cl.
*B60C 23/02* (2006.01)
*G01M 17/02* (2006.01)

(52) U.S. Cl.
CPC .................................... *G01M 17/02* (2013.01)
USPC ........................................ 73/146.5; 340/442

(58) Field of Classification Search
USPC ................................................. 73/146–146.8
See application file for complete search history.

(56) References Cited

U.S. PATENT DOCUMENTS

| | | | |
|---|---|---|---|
| 4,074,742 A | 2/1978 | Chamblin | |
| D317,880 S | 7/1991 | Meehan | |
| 6,523,586 B1 | 2/2003 | Eromaki et al. | |
| 6,744,356 B2 * | 6/2004 | Hamilton et al. | 340/444 |
| 7,180,409 B2 | 2/2007 | Brey | |
| 7,353,700 B2 | 4/2008 | Pullini et al. | |
| 7,394,357 B2 * | 7/2008 | Kurata | 340/447 |
| 7,403,105 B2 * | 7/2008 | Watabe | 340/447 |
| 7,656,282 B2 * | 2/2010 | Saitou et al. | 340/442 |
| 7,791,460 B2 * | 9/2010 | Watabe | 340/442 |
| 7,854,163 B2 * | 12/2010 | Mori et al. | 73/146 |
| 7,938,157 B2 | 5/2011 | Chen | |
| 2006/0042734 A1 | 3/2006 | Turner et al. | |
| 2006/0090558 A1 | 5/2006 | Raskas | |
| 2008/0027658 A1 | 1/2008 | Ichikawa et al. | |
| 2009/0078347 A1 | 3/2009 | Niklas et al. | |

\* cited by examiner

*Primary Examiner* — Andre Allen

(57) ABSTRACT

A re-usable tire monitor assembly for detecting wear of the tire includes a band that is selectively coupled to the tire on a vehicle. A processor is coupled to the band. A first sensor is coupled to the band. The first processor is operationally coupled to the processor so the first sensor monitors wear of the tire. A second sensor is coupled to the band. The second sensor is operationally coupled to the processor so the second sensor monitors wear of the tire. A first transceiver is operationally coupled to the band. The first transceiver is operationally coupled to the processor. A remote unit may be carried by a user. A second transceiver is coupled to the remote unit. The second transceiver is operationally coupled to the first transceiver so the first transceiver communicates information about the tire to the second transceiver.

18 Claims, 3 Drawing Sheets

RE-USABLE TIRE MONITOR ASSEMBLY

BACKGROUND OF THE DISCLOSURE

Field of the Disclosure

The disclosure relates to re-usable tire monitor devices and more particularly pertains to a new re-usable tire monitor device for detecting wear of the tire.

SUMMARY OF THE DISCLOSURE

An embodiment of the disclosure meets the needs presented above by generally comprising a band that is selectively coupled to a tire on a vehicle. A processor is coupled to the band. A first sensor is coupled to the band. The first processor is operationally coupled to the processor so the first sensor monitors wear of the tire. A second sensor is coupled to the band. The second sensor is operationally coupled to the processor so the second sensor monitors wear of the tire. A first transceiver is operationally coupled to the band. The first transceiver is operationally coupled to the processor. A remote unit may be carried by a user. A second transceiver is coupled to the remote unit. The second transceiver is operationally coupled to the first transceiver so the first transceiver communicates information about the tire to the second transceiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
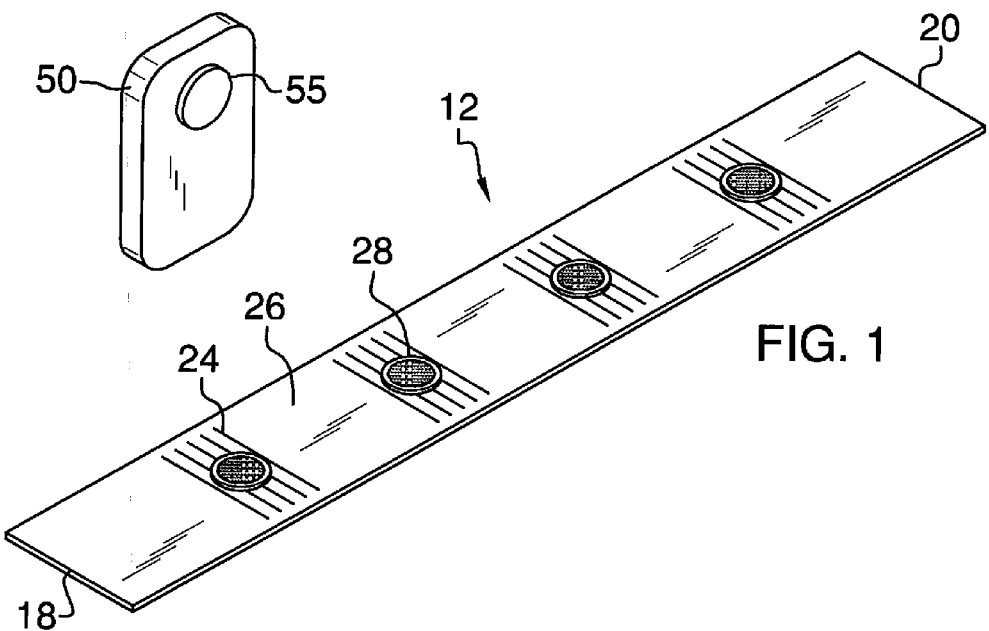
FIG. 1 is a perspective view of a re-usable tire monitor assembly according to an embodiment of the disclosure.
Figure 2:
FIG. 2 is a right side view of an embodiment of the disclosure.
Figure 3:
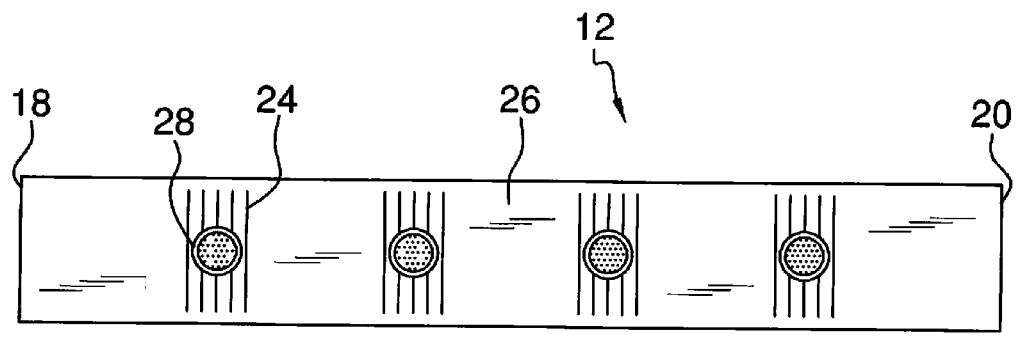
FIG. 3 is a top view of an embodiment of the disclosure.
Figure 4:
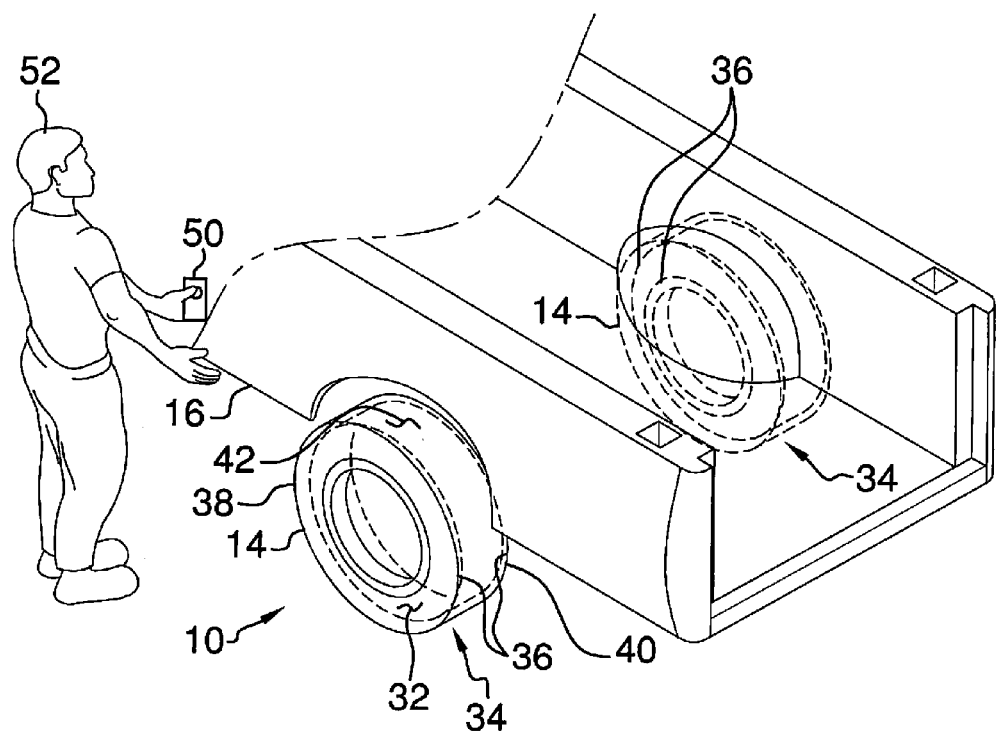
FIG. 4 is a in-use view of an embodiment of the disclosure.
Figure 5:
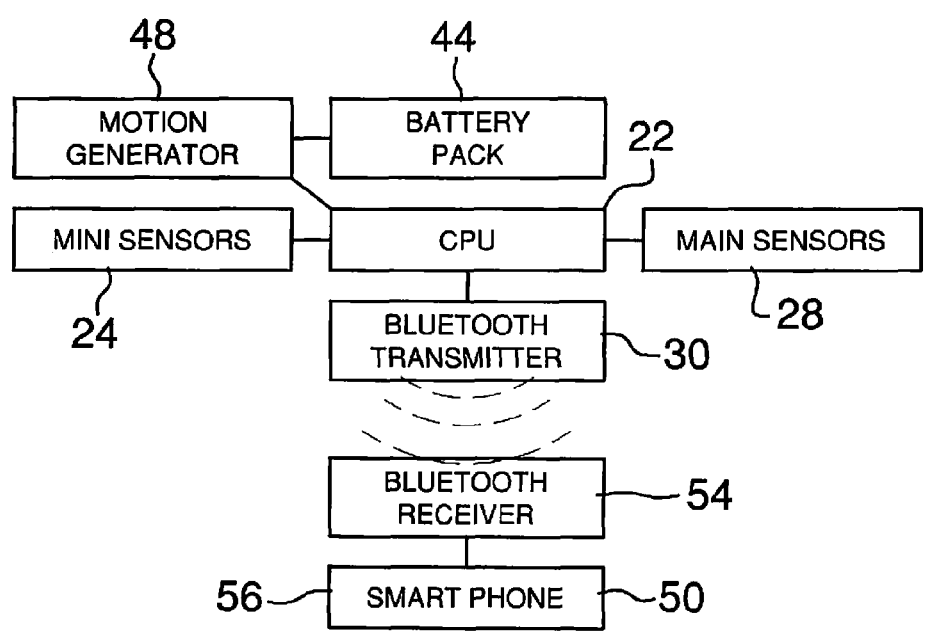
FIG. 5 is a schematic view of an embodiment of the disclosure.

With reference now to the drawings, and in particular to FIGS. 1 through 5 thereof, a new re-usable tire monitor device embodying the principles and concepts of an embodiment of the disclosure and generally designated by the reference numeral 10 will be described.

As best illustrated in FIGS. 1 through 5, the re-usable tire monitor assembly 10 generally comprises a band 12 that is selectively operationally coupled to a tire 14 on a vehicle 16. The tire 14 may be a tire 14 of any conventional design. Moreover, the vehicle 16 may be a vehicle 16 of any conventional design. The band 12 is elongated along a longitudinal axis extending between a first end 18 and a second end 20 of the band 12. Lastly, the band 12 may have a length between 60 cm and 122 cm and a width between 2 cm and 5 cm.

A processor 22 is coupled to the band 12. The processor 22 may be an electronic processor of any conventional design. A first sensor 24 is coupled to a top side 26 of the band 12. The first sensor 24 is electrically coupled to the processor 22 so the first sensor 24 monitors wear of the tire 14. Moreover, the first sensor 24 may be a pressure sensor of any conventional design. The first sensor 24 detects an amount of weight applied to the tire 14. Lastly, the first sensor 24 is one of a plurality of the first sensors 24 that is evenly distributed between the first end 18 and the second end 20 of the band 12.

A second sensor 28 is coupled to the top side 26 of the band 12 so the second sensor 28 is positioned on the first sensor 24. The second sensor 26 is electrically coupled to the processor 22 so the second sensor 28 monitors wear of the tire 14. Moreover, the second sensor 28 may be a electromagnetic sensor of any conventional design. The second sensor 28 detects a thickness of the tire 14. Lastly, the second sensor 28 is one of a plurality of the second sensors 28 that is evenly distributed between the first end 18 and the second end 20 of the band 12.

A first transceiver 30 is operationally coupled to the band 12. The first transceiver 30 is electrically coupled to the processor 22. Moreover, the first transceiver 30 may be an RF transceiver of any conventional design. Finally, the first transceiver 30 selectively broadcasts information from the each of the plurality of first 24 and second 28 sensors.

The band 12 is positionable on an inside surface 32 of the tire 14 so the first 24 and second 28 sensors abut the inside surface 32 of the tire 14. Further, the first end 18 and the second end 20 of the band 12 abut one another when the band 12 is positioned on the inside surface 32 of the tire 14. Additionally, the band 12 is one of a plurality of the bands 12. The plurality of the bands 12 comprises a plurality of sets of the bands 34.

Each of the plurality of sets of bands 34 comprises a pair of bands 36. Each of the plurality of sets of the bands 34 is positionable on an associated one of a plurality of tires 14 on the vehicle 16. Additionally, each of the pair of bands 36 in the plurality of sets of bands 34 is positionable proximate an associated one of a first lateral side 38 and a second lateral side 40 of an associated one of the plurality of tires 14. The pair of bands 36 in each of the plurality of sets of bands 34 detects variations in wear over an outer surface 42 of the associated one of the plurality of tires 14.

A power supply 44 is coupled to the band 12. The power supply 44 is electrically coupled to the processor 22. Moreover, the power supply 44 may comprise at least one battery 46. The power supply 44 may alternatively comprise an inertial generator 48 of any conventional design.

A remote unit 50 is provided. Further, the remote unit 50 may be carried by a user 52. A second transceiver 54 is coupled to the remote unit 50. Moreover, the second transceiver 54 may be an RF transceiver of any conventional design. An actuator 55 is coupled to the remote unit 50. The actuator 55 is electrically coupled to the second transceiver 54. The second transceiver 54 is in electromagnetic communication with the first transceiver 30. Further, the first transceiver 30 communicates information about the wear patterns of the plurality of tires 14 to the second transceiver 54. Lastly, the actuator 54 selectively actuates the second transceiver 54. The remote unit 50 may be alternatively be a smart phone 56 of any conventional design.

In use, the user 52 positions each of the plurality of sets of bands 34 in the associated one of the plurality of tires 14. Further, the user 52 places the remote unit 50 in proximity to a selected one of the plurality of tires 14 and actuates the actuator 55. The second transceiver 54 receives information about the tire 14 wear from the first transceivers 30 on the associated set of bands 12. Continuing, the user 52 proceeds to each tire 14 on the vehicle 16 to receive the wear information from the associated set of bands 12. When the tires 14 reach the end of their service life, the plurality of bands 12 are re-installed on a replacement set of tires 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A re-usable tire monitor assembly for detecting wear of the tire, said assembly comprising:
   a band selectively coupled to the tire on a vehicle;
   a processor coupled to said band;
   a first sensor coupled to said band, said first processor being operationally coupled to said processor wherein said first sensor monitors wear of the tire;
   a second sensor coupled to said band, said second sensor being operationally coupled to said processor wherein said second sensor monitors wear of the tire;
   a first transceiver operationally coupled to said band, said first transceiver being operationally coupled to said processor;
   a remote unit configured to be carried by a user; and
   a second transceiver coupled to said remote unit, said second transceiver being operationally coupled to said first transceiver wherein said first transceiver communicates information about the tire to said second transceiver.

2. The assembly according to claim 1 further comprising said band being elongated along a longitudinal axis extending between a first end and a second end of said band.

3. The assembly according to claim 1 further comprising said first sensor being coupled to a top side of said band.

4. The assembly according to claim 1 further comprising said first sensor being electrically coupled to said processor.

5. The assembly according to claim 1 further comprising said first sensor being one of a plurality of said first sensors being evenly distributed between a first end and a second end of said band.

6. The assembly according to claim 1 further comprising said second sensor being coupled to a top side of said band wherein said second sensor is positioned on said first sensor.

7. The assembly according to claim 1 further comprising said second sensor being electrically coupled to said processor.

8. The assembly according to claim 1 further comprising said second sensor being one of a plurality of said second sensors being evenly distributed between a first end and a second end of said band.

9. The assembly according to claim 1 further comprising said first transceiver being electrically coupled to said processor.

10. The assembly according to claim 1 further comprising said band being positionable on an inside surface of the tire wherein said first and second sensors abut the inside surface of the tire.

11. The assembly according to claim 1 further comprising said band being one of a plurality of said bands.

12. The assembly according to claim 11 further comprising said plurality of said bands comprising a plurality of sets of said bands.

13. The assembly according to claim 12 further comprising said plurality of sets of said bands comprising a pair of said bands.

14. The assembly according to claim 13 further comprising each of said plurality of sets of said bands being positionable on an associated one of a plurality of tires on the vehicle.

15. The assembly according to claim 14 further comprising each of said pair of bands in said plurality of sets of bands being positionable proximate an associated one of a first lateral side and a second lateral side of an associated one of the plurality of tires.

16. The assembly according to claim 1 further comprising said second transceiver being in electromagnetic communication with said first transceiver.

17. The assembly according to claim 1 further comprising:
   a power supply coupled to said band;
   said power supply being electrically coupled to said processor; and
   said power supply comprising at least one battery.

18. A re-usable tire monitor assembly for detecting wear of the tire, said assembly comprising:
   a band selectively coupled to the tire on a vehicle, said band being elongated along a longitudinal axis extending between a first end and a second end of said band;
   a processor coupled to said band;
   a first sensor coupled to a top side of said band, said first sensor being electrically coupled to said processor wherein said first sensor monitors wear of the tire, said first sensor being one of a plurality of said first sensors being evenly distributed between said first end and said second end of said band;
   a second sensor coupled to said top side of said band wherein said second sensor is positioned on said first sensor, said second sensor being electrically coupled to said processor wherein said second sensor monitors wear of the tire, said second sensor being one of a plurality of said second sensors being evenly distributed between said first end and said second end of said band;
   a first transceiver operationally coupled to said band, said first transceiver being electrically coupled to said processor;
   said band being positionable on an inside surface of the tire wherein said first and second sensors abut the inside surface of the tire;
   said band being one of a plurality of said bands, said plurality of said bands comprising a plurality of sets of said bands, said plurality of sets of said bands comprising a pair of said bands;
   each of said plurality of sets of said bands being positionable on an associated one of a plurality of tires on the vehicle;
   each of said pair of bands in said plurality of sets of bands being positionable proximate an associated one of a first lateral side and a second lateral side of an associated one of the plurality of tires;

a power supply coupled to said band, said power supply being electrically coupled to said processor, said power supply comprising at least one battery;
a remote unit configured to be carried by a user; and
a second transceiver coupled to said remote unit, said second transceiver being in electromagnetic communication with said first transceiver wherein said first transceiver communicates information about the tire to said second transceiver.

* * * * *